(12) United States Patent
Dodane et al.

(10) Patent No.: US 9,220,374 B2
(45) Date of Patent: Dec. 29, 2015

(54) REMOVABLE DEVICE FOR GRIPPING A COOKING UTENSIL

(75) Inventors: Paul Dodane, Fesches le Chatel (FR); Pascal Drouville, Danjoutin (FR)

(73) Assignee: CRISTEL (A FRENCH COMPANY), Fesches le Chatel (FR)

( * ) Notice: Subject to any disclaimer, the term of this patent is extended or adjusted under 35 U.S.C. 154(b) by 0 days.

(21) Appl. No.: 13/979,724

(22) PCT Filed: Jan. 19, 2012

(86) PCT No.: PCT/FR2012/050114
§ 371 (c)(1),
(2), (4) Date: Dec. 30, 2013

(87) PCT Pub. No.: WO2012/098334
PCT Pub. Date: Jul. 26, 2012

(65) Prior Publication Data
US 2014/0157548 A1    Jun. 12, 2014

(30) Foreign Application Priority Data

Jan. 20, 2011 (FR) ...................................... 11 50448

(51) Int. Cl.
*B65D 25/20* (2006.01)
*A47J 45/07* (2006.01)

(52) U.S. Cl.
CPC ................ *A47J 45/07* (2013.01); *A47J 45/071* (2013.01); *A47J 45/072* (2013.01); *Y10T 16/4707* (2015.01)

(58) Field of Classification Search
CPC ........ A47J 45/07; A47J 45/072; A47J 45/071

USPC .................................................. 220/759, 752
See application file for complete search history.

(56) References Cited

U.S. PATENT DOCUMENTS

| 1,364,552 | A | * | 1/1921 | Hill | .............................. | 220/759 |
| 1,365,703 | A | * | 1/1921 | Kolb | ............................. | 220/759 |
| 2,370,860 | A | * | 3/1945 | Hanke | ............................. | 16/425 |
| 6,260,733 | B1 | | 7/2001 | Eimerman | | |
| 6,694,868 | B1 | | 2/2004 | Hung | | |
| 8,484,805 | B2 | * | 7/2013 | Munari | ........................... | 16/425 |

(Continued)

FOREIGN PATENT DOCUMENTS

| DE | 202006014535 U1 | 12/2006 |
| DE | 202010000093 U1 | 4/2010 |

(Continued)

OTHER PUBLICATIONS

International Search Report for corresponding International Application No. PCT/FR2012/050114.

*Primary Examiner* — Anthony Stashick
*Assistant Examiner* — Mollie Llewellyn
(74) *Attorney, Agent, or Firm* — Egbert Law Offices, PLLC

(57) ABSTRACT

A removable holding device for manipulating a cooking utensils has a shell having an internal cavity that opens laterally on a front face thereof via an oblong orifice. The internal cavity is adapted to receive a lug of the cooking utensil when the lug is inserted through the oblong orifice. A locking mechanism is received within a clearance chamber in the shell that is at least partially closed. The locking mechanism cooperates with an opening in the lug when the lug is received in the internal cavity. The shell is a single piece.

12 Claims, 2 Drawing Sheets

(56) References Cited

U.S. PATENT DOCUMENTS

2003/0183088 A1* 10/2003 Dodane .......................... 99/403
2005/0145637 A1* 7/2005 Lin ............................... 220/759

FOREIGN PATENT DOCUMENTS

FR 2789874 A3 8/2000
WO 0219882 A1 3/2002

* cited by examiner

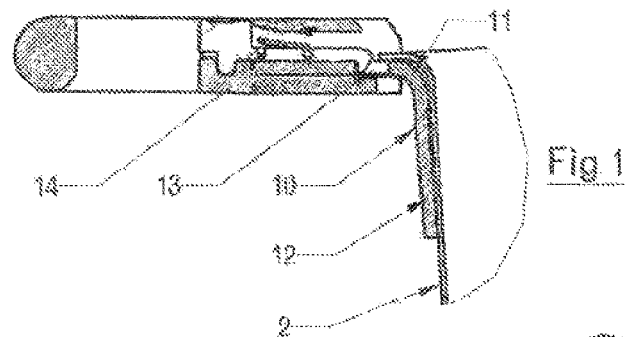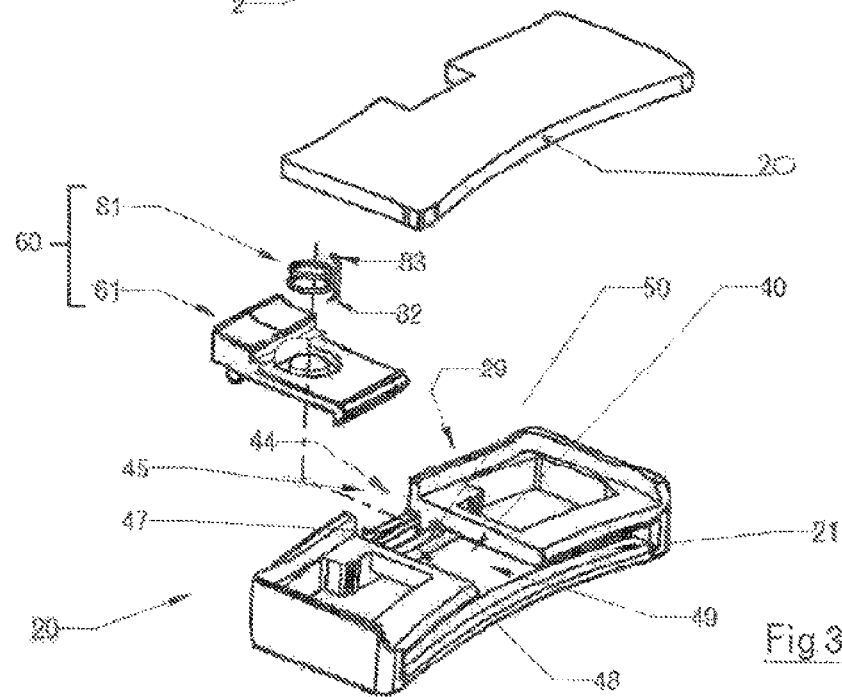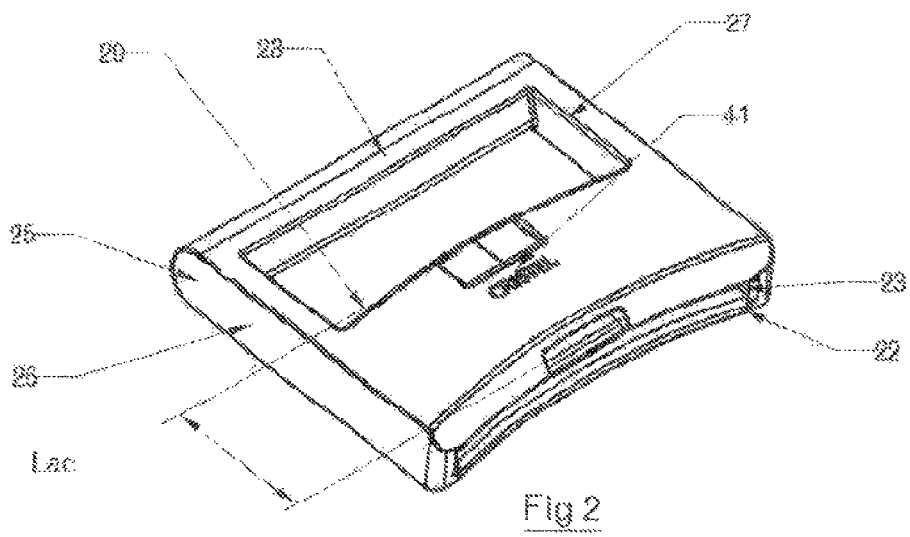

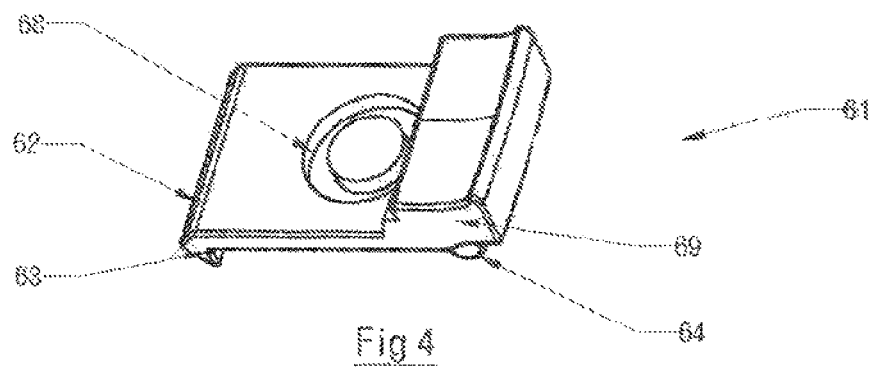
Fig 4
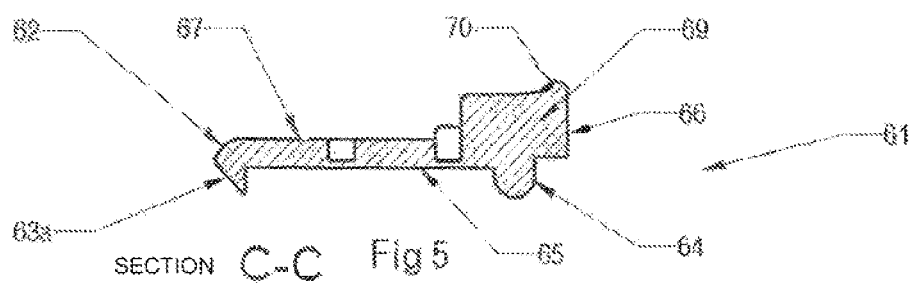
SECTION C-C  Fig 5
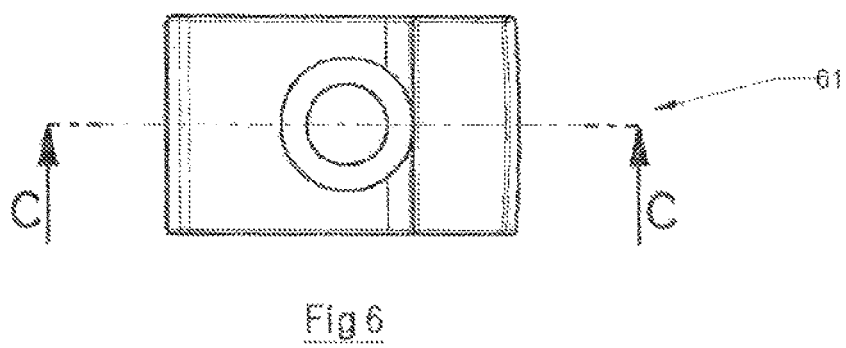
Fig 6

REMOVABLE DEVICE FOR GRIPPING A COOKING UTENSIL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a removable holding device for manipulating cooking utensils having at least one holding lug in which is provided an opening substantially parallel to an internal edge of said lug, the device including a shell comprising an internal cavity that opens laterally onto a front face of the shell via an oblong orifice, said internal cavity being adapted to receive the lug when the lug is inserted via the oblong orifice, the device also comprising locking means received inside a clearance chamber provided, in the shell and adapted to cooperate with the opening in the lug when said lug is received in the internal cavity.

2. Description of Related Art including Information Disclosed under 37 CFR 1.97 and 37 CFR 1.98

Such devices, also known as handles, are generally used in pairs, or with a facing saucepan-type handle for grasping, lifting, manipulating and pouring from hollow cooking utensils, such as saucepans or frying pans, having two diametrically opposite lugs curved outwards. Such devices enable cooking utensils, even hot ones, to be manipulated safely, notably without risk of burns.

One such holding device is known in particular from patent application FR. 2 813 516. A locking device is provided to prevent unintentional separation of the holding device from the lug and thus to prevent all risk of burns. The locking device is positioned in a clearance chamber inside a shell consisting of two half-shells assembled by screws. The locking device comprises a plate mounted to pivot about a pivot the ends of which form pivot bearings and are retained in position in cylindrical grooves formed by the two half-shells assembled on either side of the clearance chamber.

However, a device of the above kind is complex to produce. The device comprises a large number of parts, and a tool such as a screwdriver is necessary to assemble the various pans of the shell after fitting the locking device. The production of such a device on an industrial scale is therefore costly.

BRIEF SUMMARY OF THE INVENTION

The invention proposes a new bolding device comprising a particularly small number of elements and the assembly of which is facilitated.

To be more precise, the invention proposes a removable holding device (also known as a handle) for manipulating cooking utensils having at least one holding lug in winch is provided an opening, substantially parallel to an internal edge of said lug. The device includes a shell comprising an internal cavity that opens laterally onto a front face of the shell via an oblong orifice; said internal cavity is adapted to receive the lug when the lug is inserted via the oblong orifice. The holding device also comprises locking means received inside a clearance chamber provided in the shell; the locking means are adapted to cooperate with the opening in the lug when said lug is received in the internal cavity. The clearance chamber is at least partially closed at the top, which limits the risk of accidentally pressing on the locking means when the holding device is held. The risk of unintended detachment of the holding device from the cooking utensil is thus reduced. Also, the shell of the holding device according to the present invention is in one piece. No screws and no tools are therefore necessary for assembling the elements forming the shell. The assembly of the parts of the holding device is thus greatly facilitated and the manufacturing time particularly short.

In one embodiment, the locking means comprise a plate mounted to pivot inside the clearance chamber between a locking position and an unlocked position, said plate comprising at a front edge a nose adapted to be received in the opening in the lug in the locked position of the locking means and when the lug is received in the internal cavity, said plate also comprising a pivot positioned on a bottom face of the plate and in the vicinity of a rear edge of the plate, said pivot extending substantially parallel to the oblong orifice, a length of the pivot being less than or equal to a width of the plate. Since the pivot does not project on either side of the plate, the locking means may be positioned without difficulty inside the one-piece shell, as will emerge more clearly hereinafter. Moreover, the pivot o f the plate being positioned in the vicinity of the rear end of the plate, the length of the plate is limited and the width of the shell is consequently limited.

The locking means also comprise elastic return means tending to move the plate to or retain it in the locking position. The elastic return means consist, for example, of a spring positioned between a top face of the plate and an upper wall of the shell. Alternatively, the spring may be positioned between a bottom face of the plate and a lower wall of the shell if the spring is as tension spring rather than a compression spring.

In this embodiment, the number of pans necessary to produce a handle of the invention is limited to three: a one-piece shell, a pivoting plate, and elastic return means such as a spring. This number is particularly small and consequently has obvious technical and economic advantages: ease of assembly, short assembly time, minimum time to manufacture the parts of the handle, etc.

BRIEF DESCRIPTION OF THE SEVERAL VIEWS OF THE DRAWINGS

The invention will be better understood. and other features and advantages of the invention will become apparent in the light of the following description of a removable holding device conforming to embodiments of the invention. These embodiments are provided byway of nonlimiting examples. The description is to be read in conjunction with the appended drawings, in which:

FIG. 1 is a longitudinal section in a vertical plane of symmetry of a removable device of the invention locked to a lug of a cooking utensil, FIG. 2 is an external view of the device from FIG. 1, FIG. 3 is an exploded view of the device from FIG. 1, a shell of the device having been cut away to show its internal construction, and FIGS. 4 to 6 are respectively an external view, a longitudinal section and a top view of the plate of the device from FIG. 1.

DETAILED DESCRIPTION OF THE INVENTION

FIG. 1 shows a lug 10 of a cooking utensil of which only a peripheral part of a vertical lateral wall 2 is shown. The cooking utensil is for example a hollow utensil such as saucepan, and may comprise a lug or two substantially diametrically opposite lugs. The lug 10 may be made of metal or any other appropriate material, for example a plastic material; the lug has a substantially plane shape and extends substantially horizontally toward the exterior of the utensil. The lug 10 comprises an internal edge 11 extended by a fixing bracket 12 fixed to the lateral wall 2 of the utensil, for example by welding, riveting, gluing, etc. The log 10 comprises an opening 13 substantially parallel to the internal edge 11.

The holding device (or handle) of the invention comprises a shell 20 comprising an internal cavity 21 that opens laterally onto a front face 22 of the shell 20 via an oblong orifice 23. The internal cavity 21 is similar to the internal cavity of the holding device that is the subject matter of the patent FR 2 813 516. The dimensions of the internal cavity 21 are such that when the lug 10 is inserted in the oblong orifice 23 it is received in the internal cavity 21 without significant play and over its greatest extent in order to protect the hands of a user effectively if the cooking utensil is hot. in this normal position of use, the opening 13 is also received almost entirely in the internal cavity 21.

According to the invention, the shell 20 is in one piece, as clearly seen in FIG. 2. In FIG. 3, part of the upper wall of the shell 20 has been cut away and the handle is shown in an exploded view to highlight the various elements of the handle and the internal elements of the shell, as will become clearer hereinafter.

The shell 20 may be produced in a thermally insulative material or in a material that is a poor conductor of heat. It will nevertheless be noted that the holding handle of the invention is not intended to remain positioned on a utensil lug during, a utensil beating phase, but is rather intended to be installed on the lug of a utensil only during a phase of manipulating said utensil and then removed. Under these conditions, a thermally conductive material may also be used to produce the shell of the handle.

As a function of the material chosen, different manufacturing methods may be envisaged for producing the one-piece shell, for example a method of casting liquid metal, a method of injection moulding a plastic material, etc., the difficulty naturally being to produce the cavities and recesses inside the shell.

The handle also comprises locking means 60 received inside a clearance chamber 40 provided in the shell 20. The locking means is adapted to cooperate with the opening 13 in the lug 10 when said lug 10 is received in the internal cavity 21. The clearance chamber is at least partially closed at the top in order to limit the likelihood of unintended access to the locking means when the handle is locked on the lug of a utensil and is used for carrying said utensil.

In the example shown, the locking means 60 comprise a plate 61 mounted to pivot inside the clearance chamber 40 between a locking position and an unlocked position and elastic return means adapted to return the plate 2 to or retain it in a locking position.

The plate 61 is shown separately in FIGS. 4 to 6. It comprises a front end 62 terminating in a nose 63 and a pivot 64. The means for retaining the pivot in the shell are described hereinafter. The nose 63 is adapted to be received in the opening 13 in the lug 10 in the locked position of the locking means with the lug received in the internal cavity 21. In the example shown, the nose 63 is curved downward and has on its front face a bevel 63a forming a guide ramp for lifting the plate 61 by pushing the handle horizontally in the direction of the cooking utensil.

The pivot 64 is secured to the plate 61 and is positioned on a bottom face 65 of the plate 61 and in the vicinity of a rear edge 66 of the plate 61. Thus no plate clearance area is necessary to rear of the handle. The pivot 64 extends substantially parallel to the oblong orifice 23 and the length of the pivot is less than or equal to a width of the plate 61. The pivot does not project on either side of the plate; accordingly, insertion of the locking means in the shell is facilitated and it is not necessary to retain the ends of the pivot inside the shell. Since the clearance chamber is at least partially closed at the top, it is adapted to allow insertion of the plate into the clearance chamber in a substantially horizontal direction.

In the example shown, the elastic return means consist of a spring 81 and the plate 61 comprises on a top face 67, between the front edge 62 of the plate 61 and the pivot 64 of the plate, a groove 68 for lateral retention of the spring a first end 82 of which is immobilized in the groove 68 in the plate 61; a second edge 83 bears on a lower face of an upper wall 41 of the clearance chamber 40. Alternatively, the lower face of the upper wall 41 of the clearance chamber 40 comprises a groove for lateral retention of the spring the second end 83 of which is retained in the groove in the upper wall 41 of the clearance chamber 40, the first end 82 of the spring simply bearing on the upper face 67 of the plate 61, between the front edge of the plate 61 and the pivot 64 of the plate 61. Experience shows that lateral retention of only one end of the spring is sufficient, given the low height of the spring.

In another variant two grooves are provided, one on the upper face of the plate, one on the lower face of the upper wall 41 and one on the upper face of the plate 61. Thus, the two ends of the spring are retained laterally by a groove so that the spring is unable to move laterally.

In a further variant the spring is a tension spring and is positioned under the plate, between the bottom face 65 of the plate 61 and an upper face of the lower wall of the shell 20, at least one groove being provided on the bottom face 65 of the plate 61 and/or on the top face of the lower wall of the shell 20 to retain at least one end of the spring laterally.

The clearance chamber 40 opens at the rear of the handle laterally onto an upper part of the rear wall of the clearance chamber 40 via an insertion orifice 45 allowing insertion of the locking means 60 into the clearance chamber 40. Thus the locking means are inserted into the clearance chamber from the rear of the handle, in a substantially horizontal direction. Since the clearance chamber is closed at the top, the locking means is not readily accessible.

In the example shown, the insertion orifice 45 extends over the upper part of the rear wall 43 of the clearance chamber 40 and over a rear part of the upper wall 41 of the clearance chamber 40. The insertion orifice is thus particularly wide, which facilitates insertion of the locking means inside the clearance chamber. Moreover, producing the insertion orifice m this way enables limitation of the length of the locking plate because the increased thickness portion 69 and especially the bearing flange 70 (see below) are rendered accessible at the level of the upper wall of the shell; the rear face of the increased thickness portion 69 may thus be made flush with the rear face of the shell 20. Limitation of the length of the locking plate also enables limitation of the width Lac of the shell 20. Thus in the example shown the width Lac of the shell is limited to the distance between the opening and the external edge of the lug 10 plus the thickness of the two ribs 47, 48 plus the diameter of the pivot 64. Thus in the example shown the shell of the handle is hardly wider and hardly longer than the lug of the cooking utensil.

In a variant that is not shown, the insertion orifice extends over only the upper part of the rear wall 43 of the clearance chamber 40. In this case, the plate is made slightly longer than in the example shown, so as to render accessible at the rear of the handle the bearing flange 70 and possibly all or part of the increased thickness portion 69 for manipulating the locking means.

In the example shown, the plate 61 has at its rear edge 66 an increased thickness portion 69. Once the plate 61 has been inserted into the clearance chamber, the increased thickness portion closes the insertion orifice. Manual pressure on an upper face of the increased thickness portion 69 does not readily allow the plate 61 to be pivoted to the unlocked position since said upper face is positioned just above the pivot 64.

The increased thickness portion 69 of the plate is extended by a bearing flange 70. By bearing on the flange 70 rather than directly on the upper face of the increased thickness portion 69 to unlock the handle, the force is not applied in a vertical direction, at a very small distance from the pivot 64, but in an oblique direction, at a greater distance from the pivot. Thus the force to be applied to release the lug from the handle is reduced. The bearing flange 70 is preferably flush with the upper wall of the shell 20 (FIGS. 1, 2) and does not project above the upper wall of the shell 20. This eliminates the risk of accidentally bearing on the bearing flange 70, which eliminates the risk of accidental unlocking of the handle.

The means for retaining the pivot are described hereinafter.

In the example shown, a lower part of the rear wall 43 of the clearance chamber, below the insertion orifice 45, forms a first rib 47. The shell moreover comprises a second rib 48 extending from a lower wall 49 of the clearance chamber. The first and second ribs extend in a direction substantially parallel to the oblong orifice 23, at a distance from each other substantially equal to the diameter of the pivot of the plate. The two ribs together form a groove for retaining the pivot 64 of the plate 61 in the horizontal plane. The pivot is also retained in the groove, relative to a vertical axis, by the elastic return means of the locking means so that, once in place inside the groove, the pivot is not able to leave the groove and the locking means are not able to leave the clearance chamber without the intervention of a knowledgeable person.

When the lug of a utensil is inserted in the cavity 21 of the handle, an external edge of the lug conies to bear against the second rib, which thus delimits locally the internal cavity 21.

A distance between an upper face 50 of the second rib and the upper wall 41 of the clearance chamber is chosen to be substantially equal to a thickness of the plate plus a thickness of the pivot of the plate of the locking means. Thus this distance is chosen to be as small as possible whilst being sufficient for inserting the locking means inside the clearance chamber, the thickness of the handle thus being made as small as possible.

However, if the height of the spring 81 in the compressed position is slightly greater than the height of the groove 68 for retaining the spring produced on the top face of the plate 61, a distance could be chosen between the upper face 50 of the second rib and the upper wall 41 of the clearance chamber substantially equal to the thickness of the plate 61 plus the thickness of the pivot 64 plus the height of the spring 81 less the height of the groove 68.

As shown in FIG. 3, the shell 20 of the handle is sufficiently large to be grasped in the hand for easy manipulation of a cooking utensil to which the handle is locked.

In the example shown in FIG. 2, the shell also comprises a substantially U-shaped holding part 25 the ends of the two branches 26, 27 of which extend from a rear face 29 (which is also the external face of the rear wall 43 of the clearance chamber) of the shell 20, a bottom 28 of the U-shape forming a holding area of the holding device. The bottom of the U-shape, shown in the form of a rod with a diameter substantially equal to the thickness of the shell, may in some circumstances facilitate manipulation of the handle. Without departing from the scope of the invention, holding parts of different shapes may naturally be envisaged to facilitate further the manipulation of a utensil or for aesthetic reasons, for example parts with more rounded shapes, or plane parts in line with the shell 20, as shown, in a similar manner to the handle that is the subject matter of the patent FR 2 813 516.

| | |
|---|---|
| 2 | vertical wall of the utensil |
| 10 | lug |
| 11 | internal edge of the lug |
| 12 | fixing bracket of the lug |
| 13 | opening in the lug |
| 14 | outside edge of lug |
| 20 | shell of the removable device |
| 21 | internal cavity of the shell |
| 22 | front face of the shell |
| 23 | oblong orifice |
| 25 | U-shaped holding part of the shell |
| 26, 27 | branches of the U-shape |
| 28 | bottom of the U-shape |
| 29 | rear face of the shell |
| 40 | clearance chamber |
| 41 | clearance chamber upper wall groove (not visible in the FIGURES) on the upper wall of the clearance chamber |
| 43 | rear wall of the clearance chamber upper part of the rear wall 43 |
| 45 | clearance chamber insertion orifice lower part of the rear wall 43 |
| 47 | first rib |
| 48 | second rib |
| 49 | lower wall of chamber 40 |
| 50 | upper face of second rib rear part of upper wall 41 |
| 60 | unlocking means |
| 61 | pivoting plate |
| 62 | front edge of the plate 61 |
| 63 | nose of the plate 61 |
| 64 | pivot of the plate 61 |
| 65 | bottom face of the plate 61 |
| 66 | rear edge of the plate 61 |
| 67 | upper face of the plate |
| 68 | groove in the plate |
| 69 | increased thickness portion |
| 70 | flange of increased thickness portion |
| 81 | spring |
| 82 | first end of the spring |
| 83 | second end of the spring |

The invention claimed is:

1. A removable holding device for manipulating a cooking utensil, the cooking utensil having at least one holding lug, the holding lug having an opening substantially parallel to an internal edge of the holding lug, the removable holding device comprising:
a shell having an internal cavity that opens laterally onto a front face of said shell via an oblong orifice, said internal cavity being adapted to receive the lug when the lug is inserted via said oblong orifice;

a locking means received inside a clearance chamber in said shell, said clearance chamber being at least partially closed at a top thereof, said locking means comprising a plate pivotally mounted inside said clearance chamber so as to be movable between a locked position and an unlocked position, said plate having a nose at a front edge thereof, said nose adapted to be received in the opening of the lug when said plate is in said locked position and when the plate is received in said internal cavity of said shell, said plate having a pivot positioned on a bottom face thereof, said pivot extending substantially parallel to said oblong orifice, said shell being machined or molded as a single piece, said pivot having a length that is less than or equal to a width at said plate so as to allow an insertion of said locking means into said clearance chamber via an insertion orifice located on a rear wall of said clearance chamber in a substantially horizontal direction.

2. The removable holding device of claim 1, said pivot positioned adjacent to a rear edge of said plate.

3. The removable holding device of claim 2, said locking means further comprising an elastic return means for moving said plate into said locked position or for retaining said plate in said locked position.

4. The removable holding device of claim 3, said elastic return means being a spring, said plate having a groove on an upper face thereof between said front edge of said plate and said pivot, said groove laterally retaining and immobilizing a first end of said spring therein, said spring having a second end being on an upper wall of said clearance chamber.

5. The removable holding device of claim 3, said elastic return means being a spring, said upper wall of said clearance chamber having a groove that laterally retains a second end of said spring, said spring having a first end that bears on an upper face of said plate between said front edge of said plate and said pivot of said plate.

6. The removable holding device of claim 2, said plate having an increased thickness portion at said rear edge of said plate.

7. The removable holding device of claim 6, said increased thickness portion of said plate being extended by a bearing flange.

8. The removable holding device of claim 2, said clearance chamber opening laterally onto an upper part of a rear wall of said shell via said insertion orifice so as to enable the insertion of said locking means into said clearance chamber.

9. The removable holding device of claim 8, said insertion orifice extending over said upper part of said rear wall of said clearance chamber and over a rear part of said upper wall of said clearance chamber.

10. The removable holding device of claim 8, wherein a lower part of said rear wall of said clearance chamber below said insertion orifice forms a first rib, said shell comprising a second rib extending from a lower wall of said clearance chamber, said first rib and said second rib extending in a direction substantially parallel to said oblong orifice, said first rib and said second rib being at a distance from each other substantially equal to a diameter of said pivot, said first rib and said second rib defining a groove for retaining said pivot of said plate.

11. The removable holding device of claim 8, wherein a distance between an upper face of said second rib and said upper wall of said clearance chamber is substantially equal to a thickness of said plate plus a thickness of said pivot.

12. The removable holding device of claim 1, said shell having a holding part that is substantially U-shaped, said holding part having a pair of branches having ends extending from a rear face of said shell, said holding part having a bottom that defines a holding area of the holding device.

* * * * *